Aug. 21, 1962 W. ROTH 3,049,919
MASS FLOWMETER
Filed Nov. 16, 1956 5 Sheets-Sheet 1

INVENTOR
WILFRED ROTH

BY
ATTORNEYS

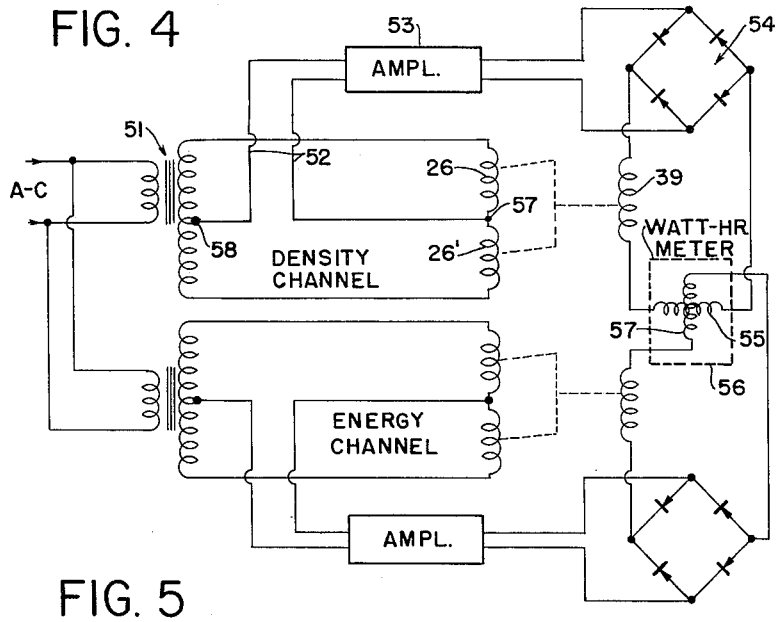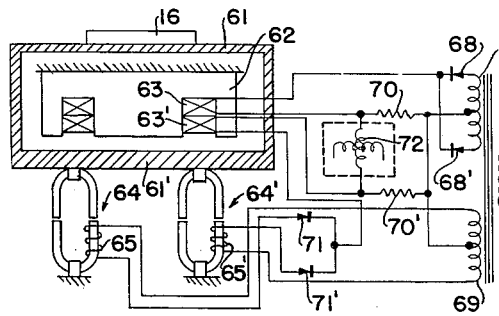

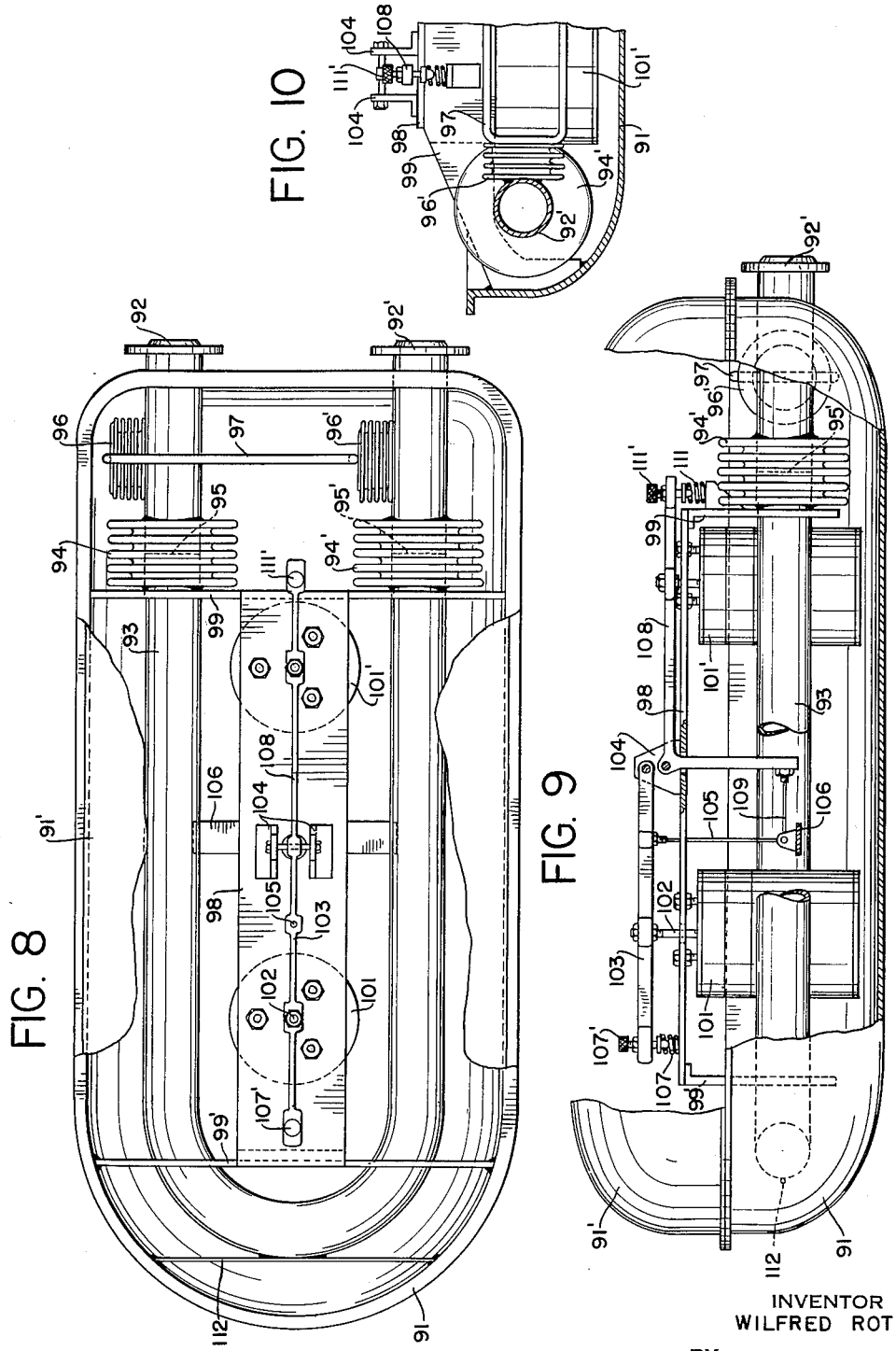

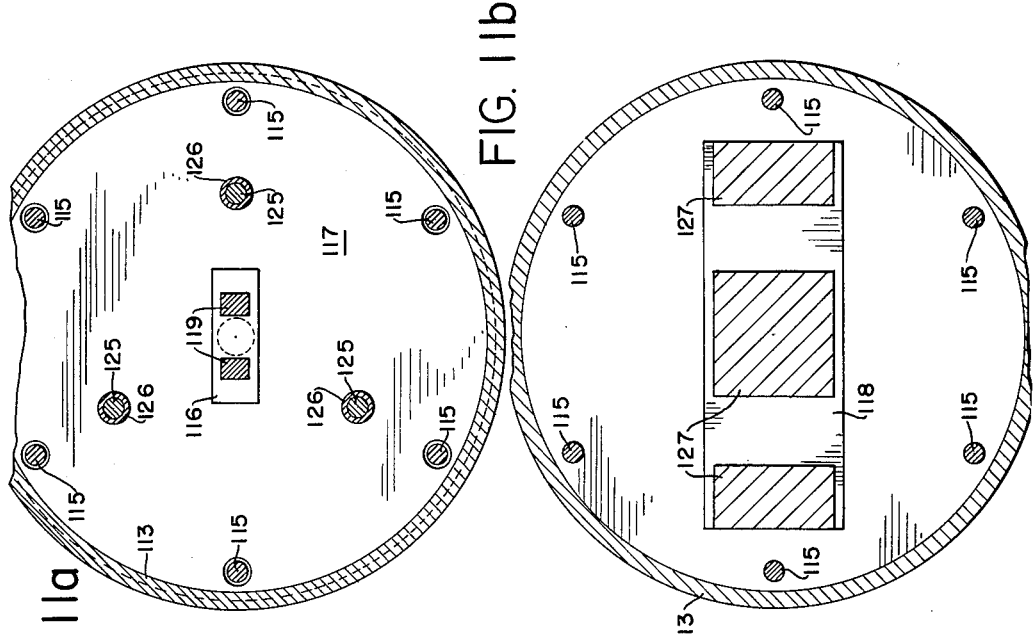
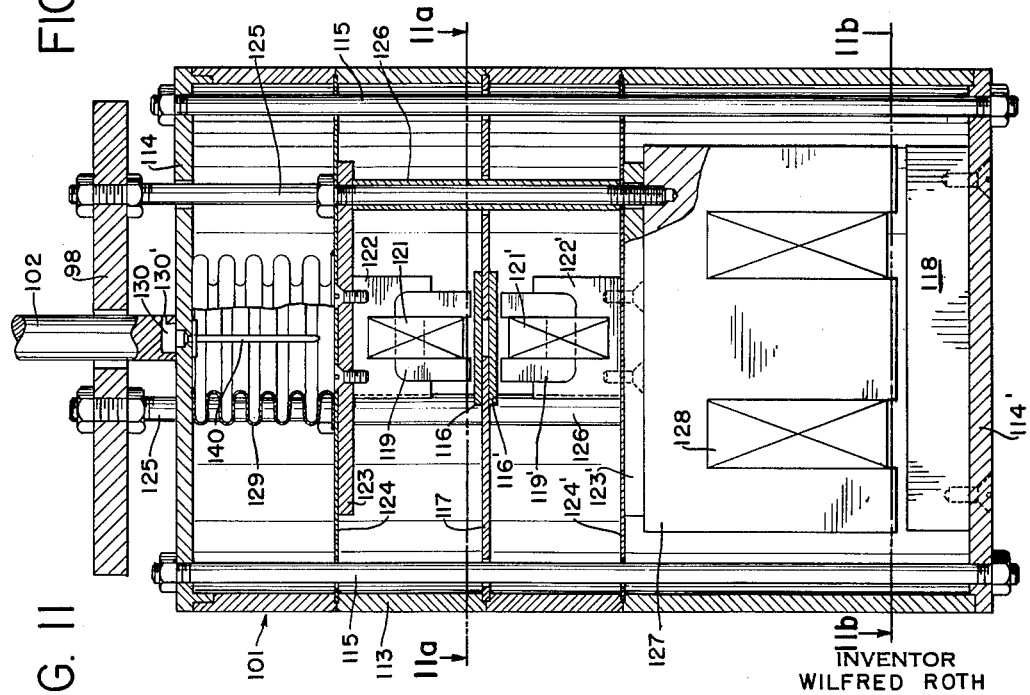

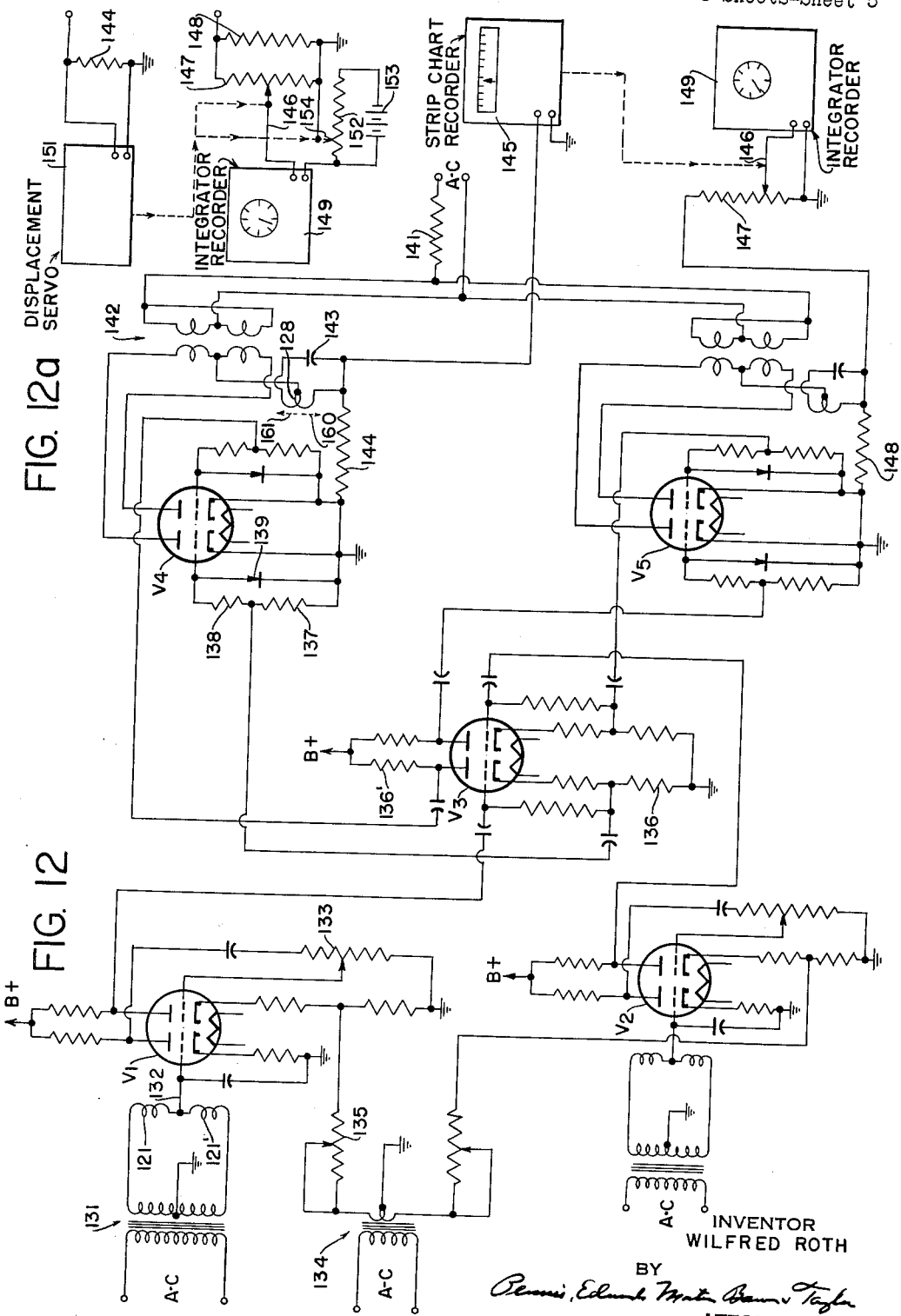

United States Patent Office 3,049,919
Patented Aug. 21, 1962

3,049,919
MASS FLOWMETER
Wilfred Roth, % Roth Laboratory for Physical Research,
1240 Main St., West Hartford, Conn.
Filed Nov. 16, 1956, Ser. No. 622,629
18 Claims. (Cl. 73—228)

This invention relates to mass flowmeters, particularly to flowmeters based upon the separate measurement of energy and density of a flowing fluid-like material and the combining of the measurements to indicate mass flow.

The possibility of measuring mass flow by separate measurement of energy and density has long been recognized and there have been some proposals for making such instruments. However, these proposals have had a number of drawbacks either in the mechanical structures employed or in the measuring means, or both.

The manner in which measurements of energy and density may be utilized to indicate mass flow may be understood from the following explanation. If the fluid-like material is assumed to flow in a conduit of given cross-sectional area, rate of mass flow may be expressed as:

$$\frac{dM}{dt} = A\rho v \quad (1)$$

where $M$ = mass of material flowing across a cross-section
$t$ = time
$A$ = cross-sectional area
$\rho$ = density
$v$ = velocity Total mass flow may be obtained by integrating the mass flow rate over the desired time. Thus, total mass flow is:

$$\int_{t_1}^{t_2} A\rho v \, dt \quad (2)$$

The energy in a flowing liquid or other fluid-like material is proportional to $\rho v^2$. Thus, if energy and density are measured, by appropriate manipulation the rate of mass flow and total mass flow may be obtained. For example, omitting proportionality constants for simplicity of presentation, dividing energy by density gives $v^2$, and by taking the square root the velocity $v$ may be obtained. Multiplying this velocity by the density gives the mass flow rate, $\rho v$, and integrating the rate gives total mass flow. Or, energy and density may first be multiplied to get $\rho^2 v^2$, and the square root then taken to obtain mass flow rate. Another possibility is to take the square root of both energy and density, and then multiply to obtain the mass flow rate.

If transducers which directly take the square root of the quantity being measured are used to measure energy and density, the outputs would be $$\sqrt{\rho v^2} \text{ and } \sqrt{\rho}$$

respectively. Then, simple multiplication of the outputs gives the mass flow rate, $\rho v$. This results in a simpler system, in general, and one aspect of the present invention is the provision of a transducer which will take the square root of the quantity being measured to a high degree of precision.

To permit the measurement of energy and density by suitable measuring devices, in accordance with the present invention the liquid or other fluid-like material is caused to flow in a curved or bent conduit so that the energy produces a proportional force on the conduit which can then be measured. Although bending through any angle will give rise to such a force, if the bend is 180°, so that the conduit is U-shaped, maximum force is developed. This facilitates measurement, and also has other advantages. The density may be obtained by weighing the curved conduit, that is, measuring the downward force due to gravity, since the weight of the liquid in the fixed volume of the conduit will vary directly with the density.

In order to permit measurement of energy and density, the curved or U-shaped conduit is flexibly supported at its ends so as to allow at least limited movement outwards in the plane of the conduit for measurement of energy, and also in the downward direction for measurement of density. In order that the forces may be measured independently, the conduit is arranged so that the energy force is horizontal, thus being perpendicular to the density force. Appreciable displacement of the conduit may impair the independency of the measurements, causing variations in density to affect the energy measurement and vice versa. To avoid such errors, it is preferred to employ a null-seeking measurement system. This also avoids errors which might arise from variation or non-linearity in the stiffness of the flexible connections, and facilitates the mechanical design. Furthermore, in practice the fluid pressure may vary and produce a force in the energy direction which will impair the accuracy of measurement, so that suitable means are provided to counteract such an effect. Other factors enter into the provision of a proper mechanical arrangement and these will be discussed hereinafter in connection with specific embodiments.

Accordingly, it is a primary object of the present invention to provide an improved mass flowmeter operating on the energy-density principle. In accordance with the invention, improved mechanical arrangements are provided in connection with the movable curved conduit section to allow proper movement thereof, means compensating for variations in fluid pressure is provided which does not impair the measuring accuracy, improved transducers and associated circuits are provided, and improved indicating means.

These and other features of the invention will be described hereinafter in conjunction with specific embodiments thereof.

In the drawings:

FIG. 4 is a circuit diagram of one form of instrumentation which may be employed with the apparatus of FIGS. 1–3;

FIG. 5 shows a modified transducer and associated circuitry using self-saturation circuits;

FIG. 6 is another modification of a transducer and circuit;

FIG. 7 is a further modification employing strain gage sensing and magnetic restoring force;

FIG. 8 is a plan view of a preferred form of mass flowmeter, with the top broken away;

FIG. 9 is a side view of the embodiment of FIG. 8, with portions broken away;

FIG. 10 is an end view of FIG. 8, partly in cross-section;

FIG. 11 is a cross-section of a preferred form of transducer used in the apparatus of FIGS. 8–10;

Figure 2:
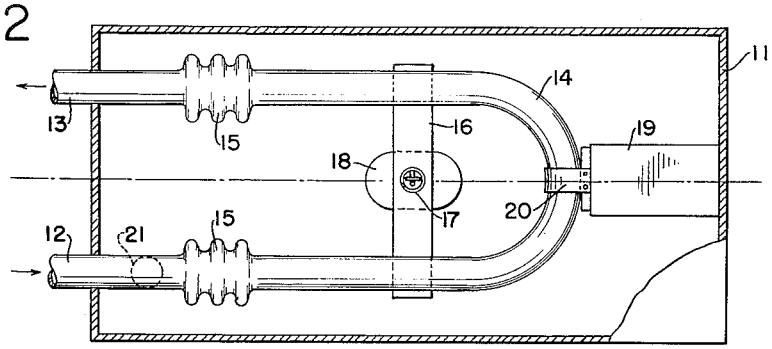
FIG. 2 is a plan view, partly in cross-section, of the embodiment of FIG. 1.

FIGS. 11a and 11b are cross-sections taken along lines 11a and 11b of FIG. 11;

FIG. 2 is a circuit diagram of measuring and indicating equipment for use with the apparatus of FIGS. 8–11; and FIG. 12a is a modification of the indicating portion of FIG. 12.

Figure 1:
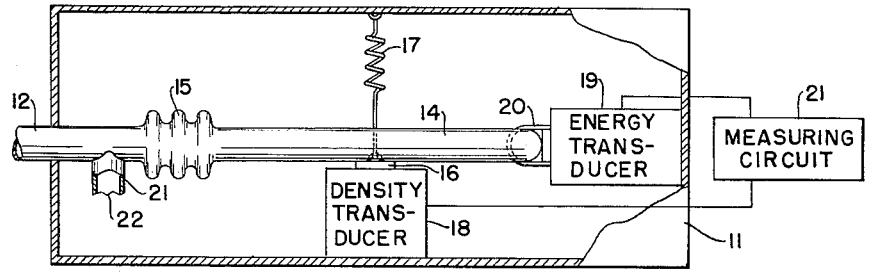
FIG. 1 is an elevation, partly in cross-section, of a mass flowmeter in accordance with the invention.

Referring now to FIGS. 1 and 2, a housing 11 has inlet and outlet pipes or fluid conduit sections 12, 13 mounted in an end wall thereof. Pipes 12, 13 are connected to the legs of a U-shaped fluid conduit section 14 through flexible couplings here shown as bellows 15. A cross bar 16 is affixed to the U-shaped section 14 and is supported at its center by spring 17 attached to housing 11. The U-shaped section lies in a horizontal plane, and a density transducer 18 is arranged to be responsive to forces in the vertical direction. To this end the transducer is mounted on housing 11 and its actuating member attached to cross bar 16. Advantageously spring 17 and transducer 18 are coupled to the cross bar at the center of gravity of the U-shaped conduit 14.

An energy transducer 19 is arranged to be responsive to forces in the horizontal direction produced by fluid flowing in the U-shaped conduit. Advantageously the energy transducer is connected to the movable conduit structure along the axis of symmetry of the U-shaped section, shown by the dot-dash line in FIG. 2, and to this end the transducer 19 is mounted on housing 11 and its actuating member attached to the center of the bend of the U-shaped conduit by a strap 20. The transducers are connected to suitable measuring circuits shown generally at 21.

In operation the pressure of the fluid in the U-shaped conduit 14 may vary and, if means were not provided to compensate for such variations, the conduit 14 would move horizontally in response to increase in pressure and vice versa, due to the flexibility of bellows 15. This would result in an error in the response of the energy transducer 19. To compensate for pressure variation, a short length of tubing 21 branches off of inlet pipe 12 and has on the outer end thereof a flexible diaphragm 22. Housing 11 is completely enclosed, and the otherwise unoccupied volume thereof is filled with a suitable fluid, such as oil. Thus if the pressures on opposite sides of diaphragm 22 are unequal, the diaphragm will expand or contract to equalize them. If the line pressure varies over only a small range and the housing 11 is initially filled with fluid under the average expected pressure, a relatively small diaphragm movement will suffice. For wider ranges of pressure variations larger diaphragms can be employed, or a bellows arrangement as illustrated in FIG. 8. This form of pressure equalization has the advantage that no fluid is withdrawn from the conduit line 12, 14, 13 and hence no errors in measurement occur.

A U-shaped movable conduit section is preferred, in order to obtain a maximum force in the energy direction and to facilitate arranging for proper movement of the conduit. However, bends less than 180° can be employed, and the energy transducer arranged to respond to forces in the direction of the axis of symmetry thereof. Indeed, although symmetrical bends are preferred, symmetry is not essential. So long as the direction of fluid flow at the exit of the curved conduit section is at an angle to the direction of flow at the entrance, an outward resultant force will be produced which will be proportional to energy, and the energy transducer can be arranged to respond to this force.

It is also preferred to arrange any structure attached to the movable conduit, such as cross bar 16, so that the resultant center of gravity of the entire movable conduit structure coincides with that of the conduit section itself. Thus when fluid flows therethrough, the center of gravity remains unchanged, and errors due to shifts in the center of gravity with variations in fluid density are avoided.

Many different forms of transducers may be employed at 18 and 19. Examples are strain gages, crystals and electromagnetic type transducers which give an output which varies with movement of the U-shaped conduit in the horizontal and vertical directions. With appropriate circuitry, such devices can be calibrated to measure energy and density, and the measurements suitably combined to give mass flow. However, if the U-shaped tube is allowed to move an appreciable distance either horizontally or vertically, changes in density may affect the energy measurement and vice versa.

It should be understood that the transducer and associated circuitry for the density measurement may be different from that for the energy measurement if desired. In many applications density will not vary over a wide range, and the minimum density will be appreciable. On the other hand, the energy will be zero for zero flow and may reach high values for rapid flow, thus requiring measurement over a wide range beginning near or at zero. Consequently simpler measurement instrumentalities may suffice for the density channel.

Viscosity is often a cause of inaccuracy in mass flowmeters and, indeed, may render many types of such meters of little practical value. In the arrangement here shown the viscosity of a liquid flowing in the U-shaped conduit causes a drag force which is tangential to the wall of the conduit. Therefore, viscosity tends to produce a rotation of the U-shaped conduit in its own plane. Since this motion is normal to the force which is a measure of the energy, and also to the force which is a measure of the density, it will not affect the accuracy of the measurements. The rotation which tends to be caused by viscosity can be restrained by simple mechanical means. For example, transducer 19 may be designed to prevent the rotation, or a wire can be employed as shown in FIG. 8. Other suitable means can, of course, be employed if desired.

Figure 3:
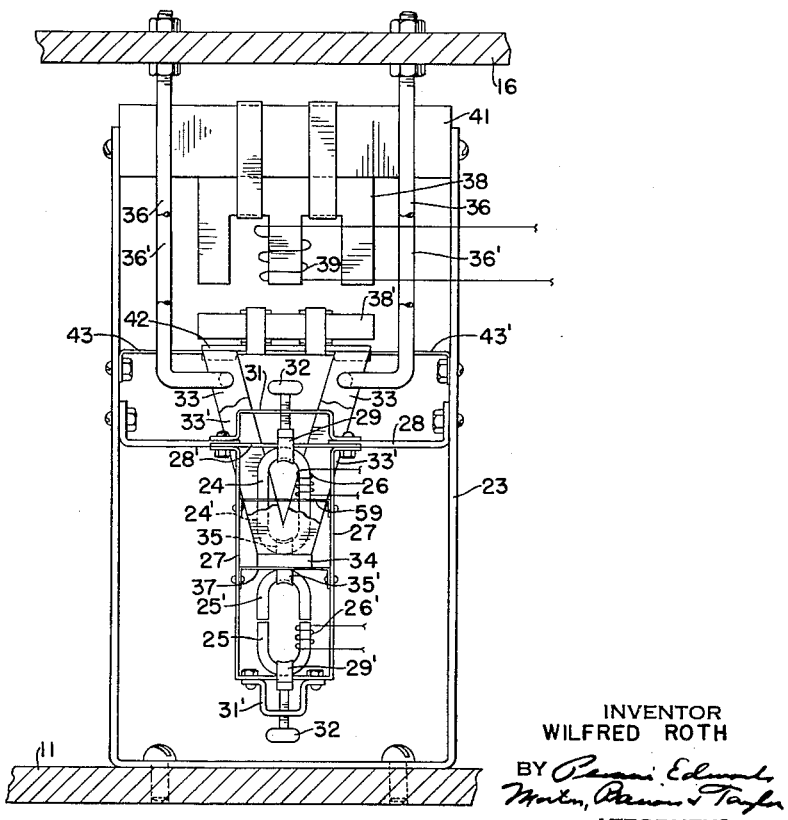
FIG. 3 illustrates one form of transducer suitable for use in the apparatus of FIGS. 1 and 2.

Referring now to FIG. 3, a transducer is shown which is suitable for use in the apparatus of FIGS. 1 and 2. The transducer employs magnetic sensing devices and a restoring force electromagnet in which the force is proportional to the square of the current supplied thereto. Thus, when employed in a suitable null-seeking circuit, the current varies as the square root of the force being measured.

A support frame 23 is provided which may be bolted or otherwise affixed to housing 11. The magnetic sensing devices have split cores of magnetic material, here shown as pairs of U-shaped core sections 24, 24' and 25, 25' with associated coils 26, 26'. A sub-frame 27 is secured to the main frame 23 by means of the cross frame member 28. One core section of each pair is stationary, and to this end section 24 is attached to frame member 28' by a collar 29, and frame member 28' is secured to frame member 28. Core section 25 is secured to the sub-frame 27 by a collar 29'. Brackets 31, 31' with screws 32, 32' bearing against respective collars 29, 29' are provided so that by turning the screws the frame members supporting core sections 24 and 25 can be slightly distorted to initially adjust the gaps between the split core sections.

One core section of each pair is movable with the U-shaped conduit of FIGS. 1 and 2. To this end a support structure is provided which here takes the form of two spaced V-shaped supports 33, 33', support 33 being in front of the upper split core sensing device as seen in FIG. 3, and shown partially broken away to reveal support 33' which is behind the upper sensing device. The bottom ends of the V's are attached to a plate 34 to which core sections 24' and 25' are attached by collars 35, 35'. Pairs of rods 36, 36' are attached to the V-shaped supports 33, 33' and extend upwards so that the structure can be secured to the cross bar 16 of the U-shaped conduit (FIG. 2). Plate 34 is flexibly attached to the sub-frame 27 by a leaf spring 37 to allow relative movement of the support structures.

Magnetic restoring force is provided by a split core electromagnet having an E-shaped core section 38 around the center pole of which is wound coil 39, and a cooperating I-shaped core section 38'. The E-core section 38 is secured to the cross member 41 mounted on the frame 23, and the I-core section 38' is secured to cross member 42 which in turn is secured to the upper ends of the V-shaped supports 33, 33'. Cross member 42 is flexibly attached to frame 23 by means of leaf springs 43, 43' to allow relative movement of the support structures.

It will therefore be understood that one split core section of each sensing device is stationary and the other movable, and one split core section of the restoring force electromagnet is stationary and the other movable. Also, the core sections of the sensing devices are mounted so that as the supporting structures are moved relative to each other, one air gap increases and the other decreases.

As illustrated, the transducer of FIG. 3 may be directly inserted in the apparatus of FIGS. 1 and 2 as the density transducer 18. Another similar transducer may be employed as the energy transducer 19. With suitable construction the transducer can be turned on its side for mounting in the orientation shown in FIGS. 1 and 2, or it could be mounted vertically and a suitable mechanical linkage provided between the moving portion of the transducer and the U-shaped conduit. One form of linkage is shown in FIG. 8.

Referring now to FIG. 4, a measuring circuit is shown for use in the apparatus of FIGS. 1 and 2, with transducers of the type shown in FIG. 3. Alternating current from a suitable power source, such as a 60 cycle A.-C. line, is supplied through a center tapped transformer 51 to the sensing coils 26, 26' of one transducer, here assumed to be the density transducer 18. Leads 52 from the center tap of the transformer secondary and the common connection of sensing coils 26, 26' are connected to the input of an amplifier 53. The output of the amplifier is rectified by a diode bridge circuit 54 and the output of the rectifier supplied to the restoring force coil 39 of the transducer. The dotted lines indicate the association of coils 26, 26' and 39 in one transducer. One actuating coil 55 of a watthour meter 56 is connected in series with coil 39.

With the U-shaped conduit 14 (FIG. 1) empty, spring 17 is adjusted to bring conduit 14 to a zero position such that the outputs of sensing coils 26, 26' are balanced and no A.-C. voltage is supplied to amplifier 53. Consequently there will be no current flowing in the actuating coil 39 of the restoring force electromagnet. If, then, liquid is admitted to the U-shaped conduit, the conduit will move downwards, thus decreasing the gap between split core sections 25, 25' of one sensing device (FIG. 3) and increasing the gap between core sections 24, 24' of the other. Thus the reluctance of the magnetic circuit of the lower sensing device will be reduced, and the inductance of the corresponding coil 26' will be increased. The opposite is true of the upper sensing device, and the inductance of coil 26 will decrease.

Returning to FIG. 4, this will result in a potential difference between the common point 57 of the two coils and the center tap 58 on the transformer, so that an A.-C. voltage will be applied to amplifier 53 and a rectified current will flow in the restoring force coil 39. As will be apparent from FIG. 3, the energization of the electromagnet by current in coil 39 will attract the movable I-core section 38' and produce a restoring force in the upward direction on cross bar 16, and hence on the U-shaped conduit 14 (FIG. 1). By making the E-core section and I-core section 38' of highly permeable magnetic material, and by making the gap therebetween sufficiently large, substantially all the reluctance of the magnetic circuit will be in the air gap. Consequently the force produced on the I-core section 38' will vary as the square of the current in coil 39 to a high degree of precision.

As the I-core section 38' and associated frame 33 move upwards, the air gap of the lower sensing device will increase and that of the upper sensing device decrease until an equilibrium point is reached. With sufficient amplification in amplifier 53, the equilibrium position will be only slightly different from the initial zero position so that there is only a very slight change in the vertical position of the U-shaped conduit 14. Further, with sufficient amplification the stiffness of the transducer circuit, that is, the restoring force per unit deflection, can be made very great compared to the stiffness of the flexible bellows 15 and tare spring 17, so that the effect of the latter on the accuracy of measurement is negligible.

By placing the coil 55 of the watthour meter in series with restoring force coil 39, a current proportional to the square root of density flows through coil 55.

The energy channel is similar except that the transducer is arranged to be responsive to energy forces. The output of the rectifier in the energy channel flows through coil 57 in the watthour meter, and the current is proportional to the square root of energy. The watthour meter multiplies these two currents to give rate of mass flow and integrates to give total mass flow. If only rate of mass flow were desired, a wattmeter could be employed instead.

From a consideration of FIG. 3 it will be recognized that current in either direction in coil 39 of the restoring force electromagnet will attract the I-core section 38'. This also follows from the fact that the restoring force is proportional to $I^2$. Consequently, if the movable structure of the transducer were momentarily above the zero position, due to hunting or extraneous effects, the resultant unbalance in the sensing coils 26, 26' would produce a current through the restoring force coil 39 which would move the structure still further upwards. This would result in instability and improper functioning.

Operation of the transducer on the wrong side of the zero position can be prevented electrically, as will be described in connection with FIG. 12, or mechanically. A simple mechanical expedient is to insert a stop to prevent movement in the wrong direction. In FIG. 3 a suitable stop is shown in the form of a brass shim 59 inserted between the upper pair of sensing core sections 24, 24'. The brass shim has substantially unity permeability so that essentially an air gap is preserved, but it limits the movement of the entire movable structure in the upper direction. Damping means can also be added either mechanically or electrically for stability of operation on the right side of the zero position.

Referring now to FIG. 5, a modified transducer and circuit is shown employing magnetic saturation effects. Here a movable frame 61 of magnetic material is arranged to be secured to the device to be measured, here shown as cross arm 16 of the U-shaped conduit of FIGS. 1 and 2. A restoring force electromagnet having a core 62 of magnetic material and a pair of coils 63, 63' is provided and is stationary, as indicated symbolically. A pair of split core sensing devices 64, 64' having respective coils 65, 65' are provided. One core section of each sensing device is secured to the frame 61 and the other core section is stationary. Any suitable mechanical support structures can be employed. For example, the structure of FIG. 3 can readily be modified so that the air gaps in the sensing devices change in the same direction, rather than in opposite directions.

A.-C. current from a suitable power source is supplied through transformer 66 to center-tapped winding 67. The center tap is connected to one end of coil 63 through resistor 70 and the outer leads are connected through rectifiers 68, 68' to the other end of coil 63, so that the coil is energized by substantially D.-C. current. Additional filter elements could be provided if desired.

Another center-tapped secondary 69 has its outer leads connected to coils 65, 65', respectively, of the sensing devices, and the other ends of the coils are connected to rectifiers 71, 71'. The center tap of secondary 69 is connected through resistor 70' to coil 63' and the other end of coil 63' is connected to the rectifiers 71, 71'.

Sensing devices 64, 64' are designed so that in the zero position the current through coils 65, 65' magnetizes the U-shaped split cores thereof to substantially the knee of the magnetization curve. Under these conditions a certain amount of current flows through coil 63′ and produces a magnetomotive force which is balanced by current through coil 63 from transformer secondary 67 and the associated rectifiers. Appropriate adjustments can be provided to insure equal currents in coils 63, 63′ in the zero position.

The zero position corresponds to the maximum gaps in the sensing devices 64, 64′ and when the gaps decrease due to flow of fluid in the curved conduit (FIG. 1), the gap reluctances decrease, thus driving the sensing devices into the magnetic saturation region. Consequently the inductance of coils 65, 65′ decreases and more current flows in coil 63′ while the current in coil 63 remains constant. Thus, an attractive force is produced between magnet core 62 and the leg 61′ of the magnetic frame 61 to pull the frame upwards and tend to restore the original gap separation.

The gaps between the sensing elements 64, 64′ are advantageously very small compared to the gap between the restoring force magnet core 62 and the leg 61′. The latter gap is advantageously sufficiently large so that the reluctance of the magnetic circuit of the restoring force electromagnet is almost entirely in the air gap, and consequently the current through coil 63 in excess of the zero current is proportional to the square root of the force to a high degree of precision.

For measuring the excess current one coil of a wattmeter or watthour meter may be connected between corresponding ends of resistors 70, 70′ and the other ends of the resistors may be connected together. Assuming coils 63, 63′ to be identical and resistors 70, 70′ identical, in the zero position equal currents will flow through the resistors in the same direction and the voltage across meter coil 72 will be zero. When off zero, the voltage will be proportional to the excess current in coil 63′. The resistance of meter coil 72 should be sufficiently greater than that of resistors 70, 70′ so that current in one coil 63, 63′ does not substantially affect current in the other. Other circuit arrangements enabling the excess current in coil 63′ to be measured can be employed if desired. For example, a low resistance meter coil may be connected in series between both coils 63, 63′ and the respective center taps, omitting resistors 70, 70′, and one pair of rectifiers reversed so that the currents flow in opposite directions through the meter coil, thereby making only the excess current effective.

Assuming the structure and circuit shown in FIG. 5 to be used in the density channel, a similar arrangement can be employed in the energy channel and used to energize the other coil of the watthour meter in the manner described in connection with FIG. 4.

FIG. 6 shows a further modified transducer and circuit in which frame 73 of magnetic material is the movable structure and has a leg 73′ which serves as the armature or split core section for core sections 74, 74′ which are stationary and of magnetic material. Coils 75, 75′ are wound on respective core sections 74, 74′ and are connected in series and supplied with A.-C. A sensing coil 76 is wound on leg 73′ and the coils 75, 75′ are wound in such a direction that the magnetic fluxes produced by the coils in leg 73′ cancel in the zero position of leg 73′ and no voltage is induced in coil 76. If the movable structure 73 moves downward the flux produced by coil 75′ will increase and that produced by coil 75 will decrease, resulting in an induced voltage in sensing coil 76. This voltage is amplified and rectified in unit 77, and the output current supplied in series to the restoring force coil 78 and one coil 79 of a watthour meter. The current in coil 78 will produce an attraction force on the leg 73′ to move the frame 73 in the upward direction toward its zero position.

With sufficient gain in amplifier 77 only very minute movements of member 73 are required over the entire measuring range and the current through coil 79 of the watthour meter will be proportional to the square root of the restoring force. The air gaps are advantageously such that the reluctance of the cores 74, 74′ and leg 73′ are negligible. Assuming the arrangement of FIG. 6 is used to measure density, a similar arrangement can be used to measure energy and the output supplied to the other coil of the watthour meter.

In FIG. 7 a resistance strain gage is employed in a bridge arrangement as the sensing device. To this end a resistance strain gage 81 is attached at one end to the movable frame 82 and at its other end to a stationary support, as symbolically shown. The restoring force is provided by a split core magnet comprising a core section 83 and associated coil 84, the other core section being constituted by the leg 82′ of the movable structure 82. Resistors 85 are connected with strain gage 81 in a bridge arrangement. Alternating current is supplied to one diagonal of the bridge and the output voltage across the other diagonal is supplied to the amplifier and rectifier 86. The output of the latter is supplied to coil 84 and one actuating coil 87 of a watthour meter.

If the bridge is balanced in the zero or rest position of movable frame 82, when the latter moves downward the bridge will become unbalanced due to change in the strain gage resistance, and current will flow through coil 84 to pull the frame 82 back toward its zero position. With sufficient gain in the amplifier the current through coil 84 and the actuating coil 87 of the watthour meter will be proportional to the square root of the force tending to move frame 82. If the arrangement shown is used in the density channel, a similar arrangement can be employed in the energy channel and the output supplied to the other coil of the meter.

Referring now to FIGS. 8, 9 and 10, a preferred form of structure is shown for the measurement of mass flow. Here the housing is a strong closed container having a lower section 91 and an upper section 91′ adapted to be bolted together, and in use is filled with a suitable liquid such as oil for balancing the line pressure. The fluid-like material whose mass flow is to be measured is admitted through a flanged pipe 92 and withdrawn from a flanged pipe 92′ sealed in the wall of lower section 91. A horizontally disposed U-shaped conduit section 93 is attached to inlet and outlet pipes by respective flexible bellows 94 and 94′. Advantageously the inlet and outlet pipes extend into the respective bellows in close proximity to the adjacent ends of the U-shaped conduit, as indicated by the dotted lines 95, 95′.

In order to maintain the pressure in housing 91 equal to that in the line, flexible compensating bellows 96, 96′ communicate with the respective input and output sections 92, 92′ and the free ends of the compensating bellows are rigidly connected together by a suitable coupling member 97. The use of two compensating bellows coupled together to compel simultaneous movement thereof is advantageous since the pressure within the housing will be maintained at the average of the pressures in the input and output lines. Although the drop in pressure of the liquid in travelling through the U-shaped conduit 93 can be made very small, it will nevertheless be finite. Thus bellows 96 at the input end would be subjected to a slightly higher internal pressure than bellows 96′ at the output end. Without coupling 97, bellows 96 might become fully extended and bellows 96′ fully contracted. With the coupling 97, both compensating bellows move together so that the actual pressure within the container will be substantially the average pressure in the input and output lines.

A longitudinal stationary plate 98 is attached to cross members 99, 99′ which in turn are welded or otherwise affixed to the lower housing section 91. A density transducer 101 and an energy transducer 101′ have their stationary structure secured to the plate 98. The movable structure of the density transducer 101 is connected by a rod 102 to a lever arm 103 which is pivoted between ears 104 attached to plate 98. Lever arm 103 is also coupled by a member 105 to a cross member 106 which is secured to the U-shaped conduit 93. The coupling to the cross member 106 is advantageously made at the center of gravity of the U-shaped conduit 93 and its associated structure, as discussed in connection with FIGS. 1 and 2. A compression spring 107 and adjusting screw 107' is provided to support the tare weight of conduit 93 and provide a zero adjustment for the density transducer 101.

The movable structure of the energy transducer 101' is connected to a right angle lever arm 108 which is pivoted between ears 104 and extends downward. The lower end is coupled through member 109 to the cross member 106 at a point along the axis of symmetry of the U-shaped conduit, which in this case is also the center of gravity. Adjustment of the zero or rest position of the conduit 93 in the direction of its axis of symmetry, and also of the energy transducer may be made by the compression spring 111 and adjusting screw 111'. To prevent movement of conduit 93 laterally in its own plane, a wire 112 is secured to the center of the U and to the lower housing 91.

FIGS. 11, 11a, 11b show details of the transducers which are employed in the arrangement of FIGS. 8–10. Here the outer casing is the movable member and comprises a cylindrical outer wall 113 and upper and lower end walls 114, 114', held together by bolts 115. The movable outer casing has a rod 102 affixed thereto, the upper end of which is connected to the lever arm 103 in the density channel, as shown in FIG. 9. For the energy channel, rod 102 of a similar transducer is connected to the lever arm 108.

The movable split core sections 116, 116' of the sensing devices are mounted on a cross member 117 which is rigidly attached to the outer wall 113 and moves therewith. The movable split core section 118 of the restoring force electromagnet is attached to the lower end wall 114'.

The stationary portions of the transducer include the U-shaped split core sections 119, 119' of the sensing devices, provided with coils 121, 121' and held in housings 122, 122'. The latter in turn are bolted or otherwise secured to support members 123, 123' which are attached to spring discs 124, 124', the outer peripheries of which are secured in outer wall 113. Also attached to the support member 123' is the E-shaped split core section 127 of the restoring force electromagnet, with an associated coil 128. Bolts 125 are attached to the support members 123, 123', with spacers 126 therebetween, and the upper ends of the bolts are attached to plate 98, as also shown in FIGS. 8 and 9.

As has been indicated before, with null-seeking systems of the type described herein instability may arise due to overshooting produced by the restoring force electromagnet, which may give rise to oscillation or "hunting" about the equilibrium position. Damping is very helpful in preventing such hunting. While damping exists in many parts of the mechanical system and also in the electrical circuits, additional damping is often required. This is particularly true since the transducer movements may be quite minute, maximum movements of the order of 100 microinches being quite feasible. Ordinary forms of mechanical damping may be quite ineffective in such cases. The transducer of FIG. 11 has incorporated therein a damping device which has been found especially effective for the purpose.

A hollow flexible member, here shown as bellows 129, has the ends thereof attached to upper end wall 114 and support member 123 so that the bellows contracts and expands with movement of the outer casing. The bellows is filled with a suitable fluid such as oil. A fluid reservoir 130 has a small orifice 130' communicating exteriorly of bellows 129, and it need be only large enough to take care of long term variations, such as changes in barometric pressure.

A needle-like element 140 having a small bore therethrough communicates at its lower end with the interior of bellows 129 and at its upper end with reservoir 130. Thus, as bellows 129 expands and contracts, fluid flows through the small bore of needle 140 and provides damping. It should be noted that no static friction is involved in producing damping, and the damping is effective for minute movements.

FIG. 12 shows the amplifier and recorder circuitry employed with the apparatus of FIGS. 8–11. Rather than relying upon mechanical stops to prevent operation on the wrong side of the zero positions, as described in connection with FIGS. 3 and 4, in FIG. 12 A.-C. biasing means is employed.

The density channel comprises tube V1, the first half of tube V3 and tube V4 with associated circuitry. The energy channel comprises tube V2, the second half of tube V3 and tube V5. These tubes are here shown as double triodes with cathode, grid and plate electrodes indicated conventionally, but other types may be employed if desired. The heater circuits have been omitted for simplicity. Only the density channel will be described in detail, since the energy channel is similar.

Alternating current from a suitable power source such as the A.-C. mains is supplied to transformer 131, and the center-tapped secondary is connected to energize the sensing coils 121, 121'. Coils 121, 121' are also shown in FIG. 11 and it will be understood that in the rest or zero position the inductances of the coils will be equal and the common connection 132 will be at ground potential. Lead 132 is connected to the grid of the first section of tube V1 which functions as an amplifier. The output of the first section is supplied to the second section, a potentiometer 133 being provided for gain control.

The second section of V1 also functions as an amplifier, but a small amount of A.-C. is supplied in the cathode circuit thereof by transformer 134 and a variable resistor 135. The output of the second section will therefore consist of an A.-C. component of fixed phase from transformer 134, and a signal component from sensing coils 121, 121' which will be in phase with the A.-C. component when the transducer is on one side of zero and out-of-phase when the transducer is on the other side of zero.

The output of the second section of tube V1 is supplied to the first section of tube V3 which functions as a split-load phase inverter having cathode and anode resistors 136 and 136' of equal value. The voltage across the cathode resistor 136 is supplied through a coupling condenser to the grid of the first section of tube V4, a shunt grid leak 137 and series resistor 138 being provided. A diode 139 may be employed to insure that the grid never goes appreciably positive to the cathode.

The voltage across the anode resistor 136' of tube V3 is similarly supplied to the grid of the second section of tube V4. Thus the sensing signal will be applied to the two grids of tube V4 in opposite phase, and the A.-C. wave from transformer 134 will also be applied to the grids of tube V4 in opposite phase to serve as an A.-C. bias.

The plates of tube V4 are energized with A.-C. from a suitable source through resistor 141 and an isolating transformer 142. A center tap on the secondary of transformer 142 is connected to a center tap on the restoring force electromagnet coil 128 and the circuit is completed to the cathode via a load resistor 144. Thus the portion of coil 128 between the center tap and lower end thereof is common to the output circuits of both sections of tube V4.

With no signal from the sensing coils, the A.-C. wave from transformer 134 will be supplied to the grids of the two sections of tube V4 in opposite phase and A.-C. will be supplied to the plates of tube V4 also in opposite phase. The phase relationships are selected so that in each section of tube V4 the A.-C. voltage on the grid is out of phase with the A.-C. on the corresponding plate, so that when either plate is positive the potential of the corresponding grid is below cutoff and no conduction occurs in either section.

If the input signal from the transducer due to unbalance in the coils 121, 121' is in phase with the A.-C. wave from transformer 134, as the two components appear on the grids of tube V4, no conduction will occur in either section. However, if the signal voltage is of opposite phase, the two sections of tube V4 will conduct and current will flow through the restoring force electromagnet coil 128. The relative phase of signal and A.-C. wave is selected so that operaiton is on the proper side of the zero position, that is, downward and outward from the zero position of the U-shaped conduit for density and energy measurements, respectively.

Due to the push-push arrangement of the two sections of tube V4, the voltage applied to the restoring force coil 128 will be similar in waveform to that of a full wave rectifier. The inductance of coil 128 will of course provide filtering action.

It will be understood from the foregoing that if at any time the transducer containing sensing coils 121, 121' is on the wrong side of its zero position, no current will be supplied to the electromagnet and operation of the system on the wrong side is prevented.

Even with operation confined to the proper side of the zero position, hunting may occur unless sufficient damping is provided. In the preferred arrangement this damping is provided by fluid-damping as described in connection with FIG. 11, and also by electrical damping.

A very satisfactory form of electrical damping is obtained in a simple manner by connecting a large condenser 143 across the restoring force coil 128, as shown. With a condenser of, for example, 3000 microfarads capacity, the outer terminals of coil 128 are substantially short-circuited down to a very low frequency. The value is selected so that the frequencies at which the condenser remains an effective short-circuit include those at which hunting is likely to occur.

The damping operation may be explained as follows. If hunting were to occur, the hunting voltage would appear across the portion of coil 128 between the center tap and the lower end thereof, and a corresponding magnetomotive force would be induced in that section of the coil, say, in the direction indicated by arrow 160. However, since the upper end of coil 128 is effectively short-circuited to the lower end at hunting frequencies, a magnetomotive force of equal magnitude but opposite in direction will be induced in the upper portion of coil 128, as indicated by arrow 161. Consequently, no resultant flux will be produced in the restoring force electromagnet at hunting frequencies, thus eliminating the force which would tend to produce hunting.

The load resistor 144 is advantageously very low, and a resistor of 0.07 ohm has been employed in a specific embodiment. The voltage across this resistor is supplied to the input of a conventional strip chart recorder 145. This voltage is proportional to the square root of density to a high degree of precision. The recorder will hence produce a record of the variations in density with time. Such recorders conventionally have an output shaft whose displacement is proportional to the input, and the recording pen indicates the position of the shaft. As here illustrated, the slider 146 of potentiometer 147 is coupled to the output shaft in the strip chart recorder 145 so that the position of the slider 146 is proportional to the density.

The energy channel is similar to the density channel and contains a load resistor 148 which is advantageously of very low value as in the case of load resistor 144 in the density channel. The voltage across resistor 148 is proportional to the square root of energy to a high degree of precision, and this voltage is applied across potentiometer 147. Consequently the voltage at the slider 146 represents the product of energy and density. This product voltage is then supplied to an integrator recorder 149 which may be of conventional construction, and indicates total mass flow.

If it is not desired to record density, the strip chart recorder 145 may be replaced by a simple displacement servomechanism which moves the slider 146 proportional to the voltage across resistor 144.

In some cases it may be found that although the transducers and associated circuitry give an output voltage which is accurately proportional to energy or density, as the case may be, the actual voltage across the load resistor reaches zero while there is still a small but finite density or energy. Such an effect can occur for various reasons, one such reason being a certain amount of remenance in the core material of the restoring force electromagnet which gives rise to a small force even though no current is flowing through the coil. While this zero error may in many cases be made negligible by proper design, FIG. 12a illustrates a circuit correcting for such errors.

In FIG. 12a a displacement servo 151 is supplied with the voltage across the density load resistor 144 and mechanically displaces the slider 146 of potentiometer 147. Instead, however, of adjusting the apparatus so that the slider 146 is at the zero position for zero voltage across load resistor 144, it is displaced slightly upwards by an amount A which represents the zero error in the density channel. The ratio of resistance at the initial displacement to the maximum resistance of potentiometer 147 is equal to the ratio of the zero error voltage A to the maximum design voltage from the density channel.

The voltage across the load resistor 148 in the energy channel is supplied across potentiometer 147 as before. This voltage, however, will have a zero error which will be designated B. The voltage at the slider 146 in FIG. 12a will hence represent the product (correct density voltage) $x$ (correct energy voltage minus B), or, stated differently, the product of the correct density and energy voltages minus a voltage representing the correct density voltage multiplied by B.

An additional potentiometer 152 is energized by a suitable source of D.C. here represented by battery 153, and its slider 154 is connected to be driven by the displacement servo 151. The voltage across potentiometer 154 is made equal to the desired correction voltage B and slider 154 is displaced by an amount A for zero voltage in the density channel as before. Consequently the voltage at slider 154 during measurement will represent the proper density voltage multiplied by B. The voltages at sliders 146 and 154 are added in series and supplied to the integrator recorder 149.

The mass flowmeter as described hereinbefore is particularly useful in measuring the mass flow of liquids, slurries, multi-phase mixtures and other fluid-like materials. It will be recognized that it offers no impediment to the normal flowing stream since no accessory structures of any kind need be introduced into the stream, the U-shaped tube merely forming part of the conduit in which the fluid is flowing.

Although the invention is primarily directed to a mass flowmeter, and the various features of the invention have particular application to mass flowmeters, certain features are capable of use in other environments. For example, the transducers and transducer circuits described herein may be applied to the measurement of forces in other environments, the needle damping arrangement shown in FIG. 11 may be employed in other types of transducers, and the circuit features of FIG. 12 and FIG. 12a may be employed in other environments.

Various combinations of the features described in the specific embodiments may be employed as meets the requirements of a particular application, and many modifications may be made within the spirit and scope of the invention.

I claim:

1. A mass flowmeter which comprises a closed housing, inlet and outlet fluid conduit sections mounted in a wall of said housing, a curved fluid conduit section within said housing, flexible couplings joining said inlet and outlet sections to the curved conduit section for fluid flow therethrough whereby a resultant force varying with flow energy is produced, said curved conduit section being oriented so that said resultant energy force is in a substantially horizontal direction, said flexible couplings allowing movement of the curved section in the direction of said resultant force and in the downward direction, the otherwise unoccupied volume of said housing being filled with fluid, flexible members attached fluid-tight to respective inlet and outlet conduit sections with opposite sides of each member subjected to fluid pressure within the respective conduit section and to fluid pressure in said housing to equalize said pressures, a substantially rigid member joining the moving portions of said flexible members to compel simultaneous movement thereof, and transducers responsive to forces in said directions for measuring energy and density of a fluid flowing in said curved conduit section.

2. A mass flowmeter which comprises a closed housing, inlet and outlet fluid conduit sections mounted in a wall of said housing, a curved fluid conduit section within said housing having an axis of symmetry and lying substantially in a horizontal plane, flexible couplings joining respective ends of said curved conduit section to said inlet and outlet sections to allow movement of the curved section in the direction of the axis of symmetry thereof and in the downward direction, the otherwise unoccupied volume of said housing being filled with fluid, a pair of flexible bellows attached fluid-tight to said inlet and outlet conduit sections respectively, the interiors of said bellows being subjected to fluid pressure within the respective conduit sections and the exteriors subjected to fluid pressure in said housing to equalize said pressures, a substantially rigid member joining the ends of said bellows which are remote from said conduit sections to compel simultaneous movement thereof, and transducers responsive to forces in said directions for measuring energy and density of a fluid flowing in said curved conduit section.

3. A mass flowmeter which comprises a closed housing, inlet and outlet fluid conduit sections mounted in a wall of said housing and spaced apart in substantially a horizontal plane, a movable conduit structure within said housing including a substantially U-shaped fluid conduit section lying substantially in said horizontal plane and a cross member attached thereto, flexible bellows joining respective legs of said U-shaped section to said inlet and outlet setcions to allow movement of the U-shaped section in the direction of the axis of symmetry thereof and in the downward direction, the otherwise unoccupied volume of said housing being filled with fluid, a pair of flexible bellows attached fluid-tight to said inlet and outlet conduit sections respectively, the interiors of said pair of bellows being subjected to fluid pressure within the respective conduit sections and the exteriors subjected to fluid pressure in said housing to equalize said pressures, a substantially rigid member joining the ends of said pair of bellows which are remote from said conduit sections to compel simultaneous movement thereof, means for preventing rotation of the movable conduit structure in the plane of said U-shaped section but allowing movement along said axis of symmetry and downward, a transducer having an actuating element connected to said cross member at substantially the center of gravity of the U-shaped conduit section and responsive to downward force thereon for measuring density of a fluid flowing therein, a transducer having an actuating element connected to said movable conduit structure at a point substantially on the axis of symmetry of the U-shaped section and responsive to outward force along said axis for measuring energy of a fluid flowing therein, and spring means connected to said cross member at substantially the center of gravity of the U-shaped conduit section to yieldably resist movement in said downward direction.

4. A mass flow meter which comprises support means, inlet and outlet fluid conduit sections attached to said support means, a curved fluid conduit section, flexible couplings joining said inlet and outlet sections to said curved conduit section for fluid flow therethrough whereby a resultant force varying with flow energy is produced, said curved conduit section being oriented so that said resultant energy force is in a substantially horizontal direction, said flexible couplings allowing movement of the curved section in the direction of said resultant force and in the downward direction, a transducer sensing device responsive to force on said curved conduit section in one of said directions to develop a corresponding electrical signal, a restoring force electromagnet having a split magnetic core respective sections of which are connected to said support means and to the curved conduit section, said electromagnet being arranged to oppose movement of the curved conduit section in said one direction, circuit means responsive to said electrical signal and supplying corresponding current to said electromagnet, whereby said current is substantially proportional to the square root of the force in said one direction, a transducer responsive to force on said curved conduit section in the other of said directions for producing a corresponding output, and indicating means responsive to said current and said output for producing an indication of mass flow.

5. A mass flowmeter which comprises support means, inlet and outlet fluid conduit sections attached to said support means, a curved fluid conduit section, flexible couplings joining said inlet and outlet sections to said curved conduit section for fluid flow therethrough whereby a resultant force varying with flow energy is produced, said conduit section being oriented so that said resultant energy force is in a substantially horizontal direction, said flexible couplings allowing movement of the curved section in the direction of said resultant force and in the downward direction, transducer sensing devices responsive to forces in said directions respectively, to develop corresponding electrical signals, restoring force electromagnets having split magnetic cores respective sections of which are connected to said support means and to the curved conduit section and arranged to oppose movement of the curved conduit section in said two directions respectively, circuit means responsive to said electrical signals and supplying corresponding currents to said electromagnets, and multiplying means responsive to the currents in said electromagnets for producing an indication of mass flow.

6. A mass flowmeter which comprises support means, inlet and outlet fluid conduit sections attached to said support means, a substantially U-shaped fluid conduit section lying substantially in a horizontal plane, flexible couplings joining respective legs of said U-shaped section to said inlet and outlet sections to allow movement of the U-shaped section in the direction of the axis of symmetry thereof and in the downward direction, transducer sensing devices responsive to forces on said U-shaped section in the outward direction along said axis of symmetry and in the downward direction, respectively, to develop corresponding electrical signals, restoring force electromagnets having split magnetic cores respective sections of which are connected to said support means and to said U-shaped section, circuit means responsive to said electrical signals and supplying corresponding current to respective electromagnets, said electromagnets being arranged to produce forces inwards along said axis of symmetry and upwards, respectively, to oppose said outward and downward forces, whereby the currents in said electromagnets are respectively substantially proportional to the square roots of the energy and density of fluid flowing in said U-shaped conduit section, and multiplying means responsive to the currents in said electromagnets for producing an indication of mass flow.

7. A mass flowmeter which comprises support means, inlet and outlet fluid conduit sections attached to said support means, a substantially U-shaped fluid conduit section lying substantially in a horizontal plane, flexible couplings joining respective legs of said U-shaped section to said inlet and outlet sections to allow movement of the U-shaped section in the direction of the axis of symmetry thereof and in the downward direction, energy and density sensing transducers responsive to movements of said U-shaped section outwards along said axis of symmetry and downwards from predetermined zero positions respectively, each of said transducers having a pair of sensing devices each including a coil and a split core of magnetic material respective sections of which are connected to said support means and to said U-shaped section, respective balanced sensing circuits including the sensing devices of respective transducers adapted to give substantially zero outputs in respective zero positions and electrical signals varying with movements of said U-shaped section in respective directions, restoring force electromagnets having split magnetic cores respective sections of which are connected to said support means and to said U-shaped section, amplifying means responsive to said electrical signals and supplying corresponding currents to respective electromagnets, said electromagnets being arranged to produce forces inwards along said axis of symmetry and upwards, respectively, to oppose said outward and downward movements, whereby the currents in said electromagnets are substantially proportional to the square roots of the energy and density respectively of fluid flowing in said U-shaped conduit section, and multiplying means responsive to the currents in said electromagnets for producing an indication of mass flow.

8. A mass flowmeter which comprises support means, inlet and outlet fluid conduit sections attached to said support means, a movable conduit structure including a substantially U-shaped fluid conduit section lying substantially in a horizontal plane, flexible couplings joining respective legs of said U-shaped section to said inlet and outlet sections to allow movement of the U-shaped section in the direction of the axis of symmetry thereof and also in the downward direction, energy and density transducers each having a first support structure attached to said support means and a relatively movable second support structure, said second support structure being connected to said movable conduit structure at a point substantially on the axis of symmetry of the U-shaped section and at substantially the center of gravity thereof respectively, each of said transducers having a pair of sensing devices each having a coil and a split core of magnetic material, the sections of each split core being attached to said first and second support structures respectively with a relatively small air gap therebetween and mounted so that the air gaps change in opposite directions with relative movement of the support structures, a restoring force electromagnet in each transducer having an actuating coil and a split core of magnetic material the sections of which are attached to said first and second support structures respectively with a relatively large air gap therebetween, the last-mentioned air gap being sufficiently large so that substantially the entire reluctance of the magnetic circuit of each restoring force electromagnet is in the air gap thereof, respective balanced sensing circuits including the sensing devices of respective transducers adapted to give substantially zero outputs in respective predetermined zero positions of said movable conduit structure and electrical signals varying with displacements from said zero positions, amplifying means supplied with said electrical signals and supplying corresponding currents to said electromagnets for movements of the conduit structure outwards along said axis of symmetry and downwards respectively so as to oppose said movements, means for preventing operation of said restoring force electromagnets inwards and upwards of said zero positions respectively, a fluid-filled hollow flexible member attached to said first and second support structures and adapted to expand and contract with relative movement therebetween, a fluid reservoir having a small orifice communicating exteriorly of said hollow member, a needle-like element having a small bore therethrough communicating at one end with the interior of said hollow member and at the other end with said reservoir, whereby relative movement between said support structures is damped by fluid flow through said needle-like element, and multiplying means responsive to the currents in said electromagnets for producing an indication of mass flow.

9. A mass flowmeter which comprises support means, inlet and outlet fluid conduit sections attached to said support means, a curved fluid conduit section, flexible couplings joining said inlet and outlet sections to said curved conduit section for fluid flow therethrough whereby a resultant force varying with flow energy is produced, said curved conduit section being oriented so that said resultant energy force is in a substantially horizontal direction, in each of the said flexible couplings allowing movement of the curved section in the direction of said resultant force and in the downward direction, energy and density sensing transducers responsive to movements of said curved conduit outwards in the direction of said resultant force and downwards from respective predetermined zero positions to develop corresponding varying electrical signals, each of said transducers having balanced sensing devices adapted to give substantially zero output in the zero position thereof and opposite electrical signals on opposite sides of the zero position, energy and density restoring force electromagnets for opposing said outward and downward movements of the curved conduit section, circuit means responsive to said electrical signals and supplying corresponding currents to said electromagnets, means for preventing operation of said restoring force electromagnets inwards and upwards of said zero positions respectively, and multiplying means responsive to the currents in said electromagnets for producing an indication of mass flow.

10. A mass flowmeter which comprises support means, inlet and outlet fluid conduit sections attached to said support means, a curved fluid conduit section having an axis of symmetry, flexible couplings joining said curved conduit section to said inlet and outlet sections for fluid flow therethrough and allowing movement of the curved section in the direction of the axis of symmetry thereof and in the downward direction, said curved conduit section being oriented with said axis of symmetry substantially horizontal, energy and density sensing transducers responsive respectively to movements of said curved conduit outwards along said axis of symmetry and downwards from predetermined zero positions to develop corresponding varying electrical signals, each of said transducers having balanced sensing devices adapted to give substantially zero output in the zero position thereof and opposite electrical signals on opposite sides of the zero position, energy and density restoring force electromagnets for opposing said outward and downward movements of the curved conduit section, circuit means responsive to said electrical signals and supplying corresponding currents to said electromagnets, means providing positive stops preventing movement of said sensing transducers and restoring force electromagnets inwards and upwards of said zero positions respectively, and multiplying means responsive to the currents in said electromagnets for producing an indication of mass flow.

11. A mass flowmeter which comprises support means, inlet and outlet fluid conduit sections attached to said support means, a curved fluid conduit section having an axis of symmetry, flexible couplings joining said curved conduit section to said inlet and outlet sections for fluid flow therethrough and allowing movement of the curved section in the direction of the axis of symmetry thereof and in the downward direction, said curved conduit section being orriented with said axis of symmetry substantially horizontal, A.-C. energized energy and density sensing transducers responsive respectively to movements of said curved conduit outwards along said axis of symmetry and downwards from predetermined zero positions to develop respective A.-C. electrical signals of predetermined phase which vary in amplitude with said movements, each of said transducers having balanced sensing devices adapted to give substantially zero output in the zero position thereof and signals of opposite phase on opposite sides of the zero position, energy and density restoring force electromagnets for opposing said outward and downward movements of the curved conduit section, amplifying means having respective inputs supplied with said electrical signals and respective outputs supplying currents proportional to the amplitudes of said signals to respective electromagnets, said amplifying means having A.-C. biasing means adapted to substantially cut off current to respective electromagnets for respective input signals opposite to said predetermined phase, and multiplying means responsive to the currents in said electromagnets for producing an indication of mass flow.

12. A mass flowmeter which comprises support means, inlet and outlet fluid conduit sections attached to said support means, a curved fluid conduit section having an axis of symmetry, flexible couplings joining said curved conduit section to said inlet and outlet sections for fluid flow therethrough and allowing movement of the curved section in the direction of the axis of symmetry thereof and in the downward direction, said curved conduit section being oriented with said axis of symmetry substantially horizontal, A.-C. energized energy and density sensing transducers responsive respectively to movements of said curved conduit outwards along said axis of symmetry and downwards from predetermined zero positions to develop respective A.-C. electrical signals of predetermined phase which vary in amplitude with said movements, each of said transducers having balanced sensing devices adapted to give substantially zero output in the zero position thereof and signals of opposite phase on opposite sides of the zero position, energy and density restoring force electromagnets for opposing said outward and downward movements of the curved conduit section, each electromagnet having a center tapped actuating coil and a capacitor connected thereacross, respective amplifiers for said A.-C. signals, each amplifier including a push-push output stage having a pair of amplifying sections with respective input circuit supplied with the corresponding A.-C. signal in opposite phase and having the portion of the corresponding electromagnet coil between the center tap and one end common to the output circuits thereof, means for supplying A.-C. waves in opposite phase to respective input circuits of said sections and A.-C. operating voltage in opposite phase to respective output circuits thereof, the phases of the A.-C. signal, A.-C. waves and A.-C. operating voltage being correlated to cause current flow in the corresponding electromagnet coils varying with departures from the respective zero positions in said outward and downward directions and to substantially cut off current for departures in respective opposite directions, said capacitors being sufficiently large to substantially prevent hunting, and multiplying means responsive to the currents in said electromagnets for producing an indication of mass flow.

13. A transducer which comprises first and second support structures flexibly connected for relative movement therebetween, a pair of sensing devices each having a coil and a split core of magnetic material, the sections of each split core being attached to said first and second support structures respectively with an air gap therebetween, a restoring force electromagnet having an actuating coil and a split core of magnetic material the sections of which are attached to said first and second support structures respectively with an air gap therebetween, the reluctance of the split core of the restoring force electromagnet being small compared to the reluctance of the air gap between the sections thereof, a fluid-filled hollow flexible member attached to said first and second support structures and adapted to expand and contract with relative movement therebetween, a fluid reservoir having a small orifice communicating exteriorly of said hollow member, and a needle-like element having a small bore therethrough communicating at one end with the interior of said hollow member and at the other end with said reservoir, whereby relative movement between said support structures is damped by fluid flow through said needle-like element.

14. A transducer which comprises relatively movable first and second support structures, a pair of sensing devices each having a coil and a split core of magnetic material, the sections of each split core being attached to said first and second support structures respectively with an air gap therebetween, a restoring force electromagnet having an actuating coil and a split core of magnetic material the sections of which are attached to said first and second support structures respectively with an air gap therebetween, the relative movement of said support structures being substantially in the direction of the length of said air gaps, the reluctance of the split core of the restoring force electromagnet being small compared to the reluctance of the air gap between the sections thereof, a balanced sensing circuit including the coils of said sensing devices for developing an electrical signal varying with relative movement between said support structures, said circuit being arranged to give substantially zero output at a predetermined zero position of said support structures, and circuit means responsive to said electrical signal and supplying corresponding current to said electromagnet, whereby said current varies substantially as the square root of a force tending to produce said relative movement.

15. A transducer which comprises relatively movable first and second support structures, a pair of sensing devices each having a coil and a split core of magnetic material, the sections of each split core being attached to said first and second support structures respectively with a relatively small air gap therebetween and mounted so that the air gaps change in opposite directions with relative movement of the support structures, a restoring force electromagnet having an actuating coil and a split core of magnetic material the sections of which are attached to said first and second support structures respectively with a relatively large air gap therebetween, the relative movement of said support structures being substantially in the direction of the length of said air gaps, a balanced sensing circuit including the coils of said sensing devices adapted to give substantially zero output in a predetermined zero position of said support structures and electrical signals varying with displacements from said zero position, amplifying means supplied with said electrical signals and supplying corresponding current to said electromagnet, and means for preventing operation of said electromagnet for displacements on one side of said zero position, whereby said current varies substantially as the square root of a force tending to produce displacement on the other side of said zero position.

16. A transducer which comprises relatively movable first and second support structures, a pair of sensing devices each having a coil and a split core of magnetic material, the sections of each split core being attached to said first and second support structures respectively with a relatively small air gap therebetween and mounted so that the air gaps change in opposite directions with relative movement of the support structures, a restoring force electromagnet having an actuating coil and a split core of magnetic material the sections of which are attached to said first and second support structures respectively with a relatively large air gap therebetween, a balanced sensing circuit supplying A.-C. to the coils of said sensing devices and adapted to give substantially zero output in a predetermined zero position of said support structures and an A.-C. signal of predetermined phase which varies in amplitude with displacements in one direction from said zero position, and amplifying means having an input circuit supplied with said A.-C. signal and an output circuit supplying current proportional to the amplitude of said signal to said electromagnet, said amplifying means having A.-C. biasing means adapted to substantially cut off current to said electromagnet for input signals opposite to said predetermined phase.

17. A transducer which comprises relatively movable first and second support structures, an A.-C. energized balanced sensing transducer responsive to relative movement of said support structures and adapted to give substantially zero output in a predetermined zero position thereof and an A.-C. signal of predetermined phase which varies in amplitude with displacement in one direction from said zero position, a restoring force electromagnet having a center-tapped actuating coil, an amplifier for said A.-C. signal including a push-push output stage having a pair of amplifying sections with respective input circuits supplied with said A.-C. signal in opposite phase and with the portion of the electromagnet coil between the center tap and one end common to the output circuits thereof, and means for supplying A.-C. waves in opposite phase to respective input circuits of said sections and A.-C. operating voltage in opposite phase to respective output circuits thereof, the phases of the A.-C. signal, A.-C. waves and A.-C. operating voltage being correlated to cause current flow in the electromagnet coil varying with departures from said zero position in said one direction and to substantially cut off current for departures in the other direction, whereby the electromagnet provides a restoring force counteracting departures in said one direction, said capacitor being sufficiently large to substantially prevent hunting.

18. A transducer which comprises relatively movable first and second support structures, a pair of sensing devices each having a coil and a split core of magnetic material, the sections of each split core being attached to said first and second support structures respectively with a relatively small air gap therebetween and mounted so that the air gaps change in opposite directions with relative movement of the support structures, a restoring force electromagnet having an actuating coil and a split core of magnetic material the sections of which are attached to said first and second support structures respectively with a relatively large air gap therebetween, the coil of said electromagnet having a center tap and the reluctance of the split core thereof being small compared to the reluctance of the air gap thereof, a capacitor connected across said electromagnet coil, a balanced sensing circuit supplying A.-C. to the coils of said sensing devices and adapted to give substantially zero output in a predetermined zero position of said support structures and an A.-C. signal of predetermined phase which varies in amplitude with displacements in one direction from said zero position, an amplifier for said A.-C. signal including a push-push output stage having a pair of amplifying sections with respective input circuits supplied with said A.-C. signal in opposite phase and with the portion of the electromagnet coil between the center tap and one end common to the output circuits thereof, and means for supplying A.-C. waves in opposite phase to respective input circuits of said sections and A.-C. operating voltage in opposite phase to respective output circuits thereof, the phases of the A.-C. signal, A.-C. waves and A.-C. operating voltage being correlated to cause current flow in the electromagnet coil varying with departures from said zero position in said one direction and to substantially cut off current for departures in the other direction, whereby the electromagnet provides a restoring force counteracting departures in said one direction, said capacitor being sufficiently large to substantially prevent hunting.

References Cited in the file of this patent

UNITED STATES PATENTS

| | | |
|---|---|---|
| 1,401,299 | Wohlenberg | Dec. 27, 1921 |
| 2,432,039 | Plank | Dec. 2, 1947 |
| 2,538,785 | Kariz | Jan. 23, 1951 |
| 2,624,198 | Pearson | Jan. 6, 1953 |
| 2,669,874 | Ziegler | Feb. 23, 1954 |
| 2,675,701 | Bidwell | Apr. 20, 1954 |
| 2,685,200 | Slottow et al. | Aug. 3, 1954 |
| 2,694,927 | Coulbourn et al. | Nov. 23, 1954 |
| 2,714,310 | Jennings | Aug. 2, 1955 |
| 2,769,337 | Rich | Nov. 6, 1956 |
| 2,804,771 | Brown | Sept. 3, 1957 |

UNITED STATES PATENT OFFICE
CERTIFICATE OF CORRECTION

Patent No. 3,049,919  August 21, 1962

Wilfred Roth

It is hereby certified that error appears in the above numbered patent requiring correction and that the said Letters Patent should read as corrected below.

Column 2, line 70, for "FIG. 2" read -- FIG. 12 --; column 11, line 13, for "operaiton" read -- operation --; column 14, line 32, after "said", first occurrence, insert -- curved --; line 62, for "current" read -- currents --; column 16, line 17, strike out "in each of the"; line 72, for "orriented" read -- oriented --.

Signed and sealed this 19th day of February 1963.

(SEAL)
Attest:

ESTON G. JOHNSON
Attesting Officer

DAVID L. LADD
Commissioner of Patents